US005999674A

United States Patent [19]
Yui et al.

[11] Patent Number: 5,999,674
[45] Date of Patent: Dec. 7, 1999

[54] OPTICAL WAVEGUIDE MODULE WITH REINFORCING MEMBER AND BUFFER PROTECTOR

[75] Inventors: Dai Yui; Masahide Saitou, both of Yokohama, Japan

[73] Assignee: Sumitomo Electric Industries, Ltd., Osaka, Japan

[21] Appl. No.: 08/913,491

[22] PCT Filed: Jan. 22, 1997

[86] PCT No.: PCT/JP97/00137

§ 371 Date: Sep. 25, 1997

§ 102(e) Date: Sep. 25, 1997

[87] PCT Pub. No.: WO97/27505

PCT Pub. Date: Jul. 31, 1997

[30] Foreign Application Priority Data

Jan. 26, 1996 [JP] Japan .................................. 8-012025

[51] Int. Cl.[6] .................................................. G02B 6/30
[52] U.S. Cl. ............................. 385/49; 385/51; 385/99
[58] Field of Search .................................. 385/49–51, 99

[56] References Cited

U.S. PATENT DOCUMENTS

| | | | |
|---|---|---|---|
| 5,367,591 | 11/1994 | Seike et al. ............................... | 385/51 |
| 5,426,714 | 6/1995 | Gadkaree et al. ......................... | 385/39 |
| 5,444,804 | 8/1995 | Yui et al. .................................. | 385/49 |
| 5,481,632 | 1/1996 | Hirai et al. ................................ | 385/49 |
| 5,513,290 | 4/1996 | Ishikawa et al. .......................... | 385/49 |
| 5,625,730 | 4/1997 | Ishikawa et al. .......................... | 385/49 |
| 5,696,860 | 12/1997 | Semura et al. ............................ | 385/49 |

FOREIGN PATENT DOCUMENTS

| | | | |
|---|---|---|---|
| 422 445 | 4/1991 | European Pat. Off. ................. | 385/49 |
| 738 908 | 10/1996 | European Pat. Off. ................. | 385/49 |
| 2-77704 | 3/1990 | Japan ..................................... | 385/49 |
| 3-202804 | 9/1991 | Japan ..................................... | 385/49 |
| 5-27139 | 2/1993 | Japan ..................................... | 385/49 |
| 7-92342 | 4/1995 | Japan ..................................... | 385/49 |
| 7-128538 | 5/1995 | Japan ..................................... | 385/49 |
| 7-140349 | 6/1995 | Japan ..................................... | 385/49 |
| 8-286073 | 11/1996 | Japan ..................................... | 385/49 |
| 8-94876 | 4/1997 | Japan . | |
| 9-94876 | 4/1997 | Japan ..................................... | 385/49 |

*Primary Examiner*—John D. Lee
*Assistant Examiner*—Victoria D. Hao
*Attorney, Agent, or Firm*—Pillsbury Madison & Sutro

[57] ABSTRACT

The present invention relates to an optical waveguide module constructed in the structure that can reduce the number of package components for housing an optical waveguide device for optically interconnecting optical fibers and that can protect the optical waveguide device against stress caused by change of ambient temperature and against impact acting from the outside. This waveguide module comprises a reinforcing member directly adhered to a buffer protector covering the optical waveguide device. This reinforcing member is a plate member bent so that the both ends face each other, and it houses the whole of the optical waveguide device covered by the buffer protector in the internal space thereof.

23 Claims, 14 Drawing Sheets

OPTICAL WAVEGUIDE MODULE WITH REINFORCING MEMBER AND BUFFER PROTECTOR

TECHNICAL FIELD

The present invention relates to an optical waveguide module which encapsulates an optical waveguide device utilized for branching, coupling, or the like of signal light in an optical transmission system. More particularly, the invention concerns the package structure of the optical waveguide module applicable to fiber-optic communication systems requiring high reliability.

BACKGROUND ART

The conventional optical waveguide modules are arranged to comprise an optical waveguide device, which is utilized for branching, coupling, or the like of signal light, for optically interconnecting optical fibers being transmission lines, and a case for enclosing the optical waveguide device therein. Further, a space between the case and the optical waveguide device is filled with a buffer protector. The buffer protector functions to absorb impact or the like exerted from the outside of the case on joint portions and the like between an optical waveguide incorporated in the optical waveguide device and optical fibers.

Here, the above optical waveguide device comprises a waveguide substrate having an optical waveguide provided in its upper surface and having the function of branching, coupling, etc. of signal light, a silicon V-grooved support member (first support member) for optically connecting one end of the optical waveguide with one end of an input optical fiber, attached to the tip of the input optical fiber, and a silicon V-grooved support member (second support member) for optically connecting the other end of the optical waveguide with one end of an output optical fiber, attached to the tip of the output optical fiber. The first and second support members are fixed to the both end faces of the waveguide substrate with the optical waveguide being axially aligned with the input and output optical fibers (or in an optically interconnected state).

The structure of optical waveguide module as described above is disclosed, for example, in Japanese Laid-open Patent Application No. 5-27139.

DISCLOSURE OF INVENTION

The present invention concerns the package structure of the optical waveguide module applicable to fiber-optic communication systems requiring high reliability. The inventors investigated the conventional optical waveguide module as described above and found that the conventional optical waveguide module cannot sufficiently prevent occurrence of expansion and contraction of the case with change of ambient temperature.

Namely, the input optical fiber and output optical fiber are subject to tensile stress under high-temperature environment or subject to shear stress under low-temperature environment, depending upon their setting environment. This results in deteriorating adhesive strength of an adhesive bonding the V-grooved support member to the waveguide substrate with a lapse of time, which will increase optical losses due to axial shift at the joint surfaces between these members. Further, if deterioration of adhesive strength of the adhesive is great, the V-grooved support member can be peeled off from the waveguide substrate.

A conceivable countermeasure is to change the material for the case to glass or liquid crystal polymer with a low coefficient of linear thermal expansion, but in this case, glass has such a strength property that it is weak against impact, while the liquid crystal polymer has such a processing property that it is not easy to make a thin case thereof. Therefore, they cannot achieve downsizing of the case as a result.

It is also conceivable to preliminarily give the input optical fiber and output optical fiber a marginal length and encapsulate them in a curved state inside the case. However, the encapsulating work of these optical fibers requires too much labor and time, which is not suitable for mass production.

It is, therefore, an object of the present invention to provide an optical waveguide module excellent in environmental resistance characteristics and high in reliability, which can reduce the number of components of a package for housing the optical waveguide device and which has the package structure capable of protecting the optical waveguide device against stress due to the change of ambient temperature or against impact or the like acting from the outside.

In order to achieve the above object, an optical waveguide module according to the present invention comprises, for example as shown in FIGS. 2–7, an optical waveguide device 30 as an optical functional device having the function of branching, coupling, or the like of signal light, for optically interconnecting optical fibers, a first reinforcing member 110 (a metal plate member) constituting at least a part of a case housing the optical waveguide device 30, and a buffer protector 400 covering at least the optical waveguide device 30 and parts of the optical fibers and adhering to the first reinforcing member 110 in predetermined strength.

The optical waveguide device 30 has a waveguide substrate 32 in an upper surface 321 of which an optical waveguide 320 is provided, a first support member 31 attached to the tip of input optical fiber 340 and fixed to one end face of the waveguide substrate 32 in such a state that one end of the optical waveguide 320 is optically connected to one end of the input optical fiber 340, and a second support member 33 attached to the tip of output optical fiber 360 and fixed to the other end face of the waveguide substrate 32 in such a state that the other end of the optical waveguide 320 is optically connected to one end of the output optical fiber 360 (see FIG. 1). An optical fiber comprises a core having a predetermined index of refraction and a cladding provided around the periphery of the core and having an index of refraction lower than that of the core.

The first reinforcing member 110 is a metal plate having a reference surface 111 facing the waveguide substrate 32 and shaped so as to be open at least in the longitudinal direction of the optical waveguide device 30, which has edge portions 170, 171 (first and second edge portions) as bent so as to face each other. In addition, at least a part of the optical waveguide device 30 is housed in a space defined by the reference surface 111, a surface 112 of the edge portion 170 continuous from the reference surface 111, and a surface 113 of the edge portion 171 continuous from the reference surface 111.

The buffer protector 400 adheres to at least the reference surface 111 of the first reinforcing member 110 in the predetermined strength and has such adhesive strength that the product of the adhesive strength and an adhesion area on the reference surface 111 of the first reinforcing member 110 in contact with the buffer protector 400 is 0.5 or more kgf (Bellcore standard). Particularly, preferable materials for the buffer protector 400 have the modulus of elasticity in the range of 1 kgf/cm² to 20 kgf/cm² after curing.

The buffer protector 400 is relatively soft because of possession of the modulus of elasticity in the range of 1 kgf/cm² to 20 kgf/cm² after curing. Because of it, even if the case is subject to thermal expansion or thermal contraction with change of ambient temperature, thermal stress acting on the optical waveguide device 30 can be suppressed by intervention of the buffer protector 400.

The buffer protector 400 can be filled uniformly between the case and the optical waveguide device 30 by capillarity, immediately flowing it into the case. Therefore, no gap remains between the case and the optical waveguide device 30, so that no thermal stress will occur from the inside of the buffer protector 400.

Further, since the buffer protector 400 has the relatively low modulus elasticity and the case (metal plate) has relatively high strength, mechanical impact acting on the optical waveguide device 30 from the outside of the case is buffered through the buffer protector 400 and the case. These stably fix and position the optical waveguide device 30 even with occurrence of change of ambient temperature or even with action of external impact thereon. In addition, the above arrangement can reduce the temporal change of adhesive strength of the adhesive adhering the first support member 31, waveguide substrate 32, and second support member 33 to each other.

Therefore, the well-aligned state can be maintained at each of the first joint part between the input optical fiber 340 and the optical waveguide 320 and the second joint part between the optical waveguide 320 and the output optical fiber 360. In addition, losses of optical signal transmitted from the input optical fiber to the output optical fiber can be suppressed stably with a lapse of time.

Further, the optical waveguide module according to the present invention comprises a first edge component 210 (150) having a through hole 211 (151) for letting the input optical fiber 340 pass and an adhesion surface 212 (153) to be bonded to the buffer protector 400, and a second edge component 220 (160) having a through hole 221 (161) for letting the output optical fiber 360 pass and an adhesion surface 222 (163) to be bonded to the buffer protector 400. In this way, these first and second edge components 210, 220 close the open areas in the longitudinal direction of the optical waveguide device 30.

Further, the optical waveguide module according to the present invention may be arranged in such a way that the buffer protector 400 is provided in the space defined by the reference surface 111 of the first reinforcing member 110, the surface 112 of the edge part 170 continuous from the reference surface 111, and the surface 113 of the edge part 171 continuous from the reference surface 111 in such a state as to cover the whole of the optical waveguide device 30 and that the buffer protector also covers the whole of the first reinforcing member 110 (see FIGS. 11 and 12).

Further, the case housing the first optical waveguide device 30 may be comprised of the foregoing first reinforcing member 110 and a second reinforcing member 120 having a reference surface 121 facing the waveguide substrate 32 and shaped so as to be open at least in the longitudinal direction of the optical waveguide device 30. Particularly, this second reinforcing member 120 also has edge portions 180, 181 (third and fourth edge parts) bent so as to face each other. The second reinforcing member 120 is positioned so that the reference surface 121 thereof faces the reference surface 111 of the first reinforcing member 110 with the optical waveguide device 30 inbetween (see FIG. 16). At this time, the second reinforcing member 120 engages with the first reinforcing member 110 with the edge portions thereof 180, 181 holding the edge portions 170, 171 of the first reinforcing member 30.

When the case is comprised of the first and second reinforcing members 110, 120 in this way, the buffer protector 400 can also be arranged to cover the whole of the first reinforcing member 110 and the whole of the second reinforcing member 120 as covering the whole of the optical waveguide device 30.

BEST MODE FOR CARRYING OUT THE INVENTION

Figure 1:
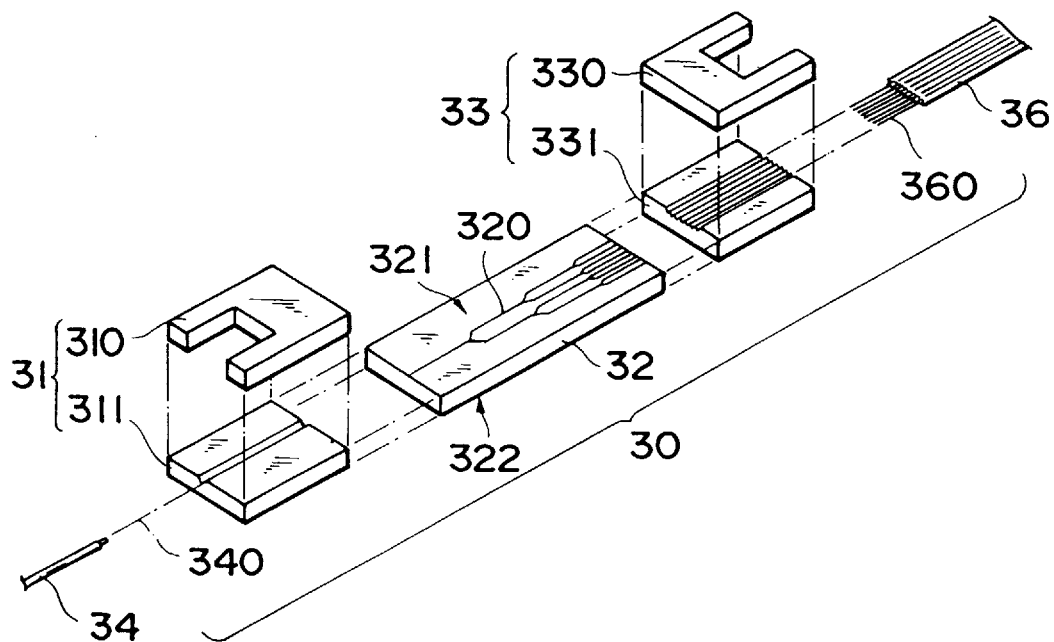
FIG. 1 is an assembly step diagram for explaining the structure of the optical waveguide device mounted in the optical waveguide module according to the present invention.
Figure 2:
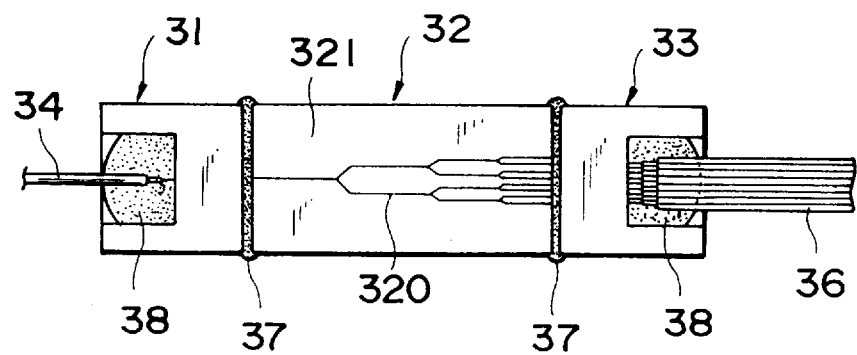
FIG. 2 is a plain view of the optical waveguide device mounted in the optical waveguide module according to the present invention.

The structure of each embodiment of the optical waveguide module according to the present invention will be described with reference to FIG. 1 to FIG. 21. The same elements in the drawings will be denoted by the same reference numerals and redundant description will be omitted. It is also noted that the dimensional ratios of the drawings are not always coincident with those in the description.

FIG. 1 is an assembly step diagram for explaining the structure of the optical waveguide device mounted in the optical waveguide module according to the present invention. As shown in this figure, the optical waveguide device 30 comprises a fiber support 31 (first support member) attached to the tip of input optical fiber 340 for transmitting signal light and fixed to the tip, a waveguide substrate 32 in an upper surface 321 of which an optical waveguide 320 for branching or coupling the signal light incident to its input end from the input optical fiber 340 to guide the signal light to its output end is provided, and a fiber support 33 (second support member) attached to the tip of output optical fibers 360 for guiding the signal light emerging from the output end of the optical waveguide 320 and fixed to the tip. In addition, these fiber supports 31, 33 are bonded to either end face of the waveguide substrate 32 with a first adhesive 37.

The fiber support 31 comprises a silicon lower member 311 for supporting the single-core input optical fiber 340 in its single V-shaped groove formed in its surface, and an upper member 310 of transparent glass adhered, together with the lower member 311, to the input optical fiber 340 with a second adhesive 38 and bonded onto the surface of the lower member 311 with the second adhesive 38. The back surface of this upper member 310 urges the input optical fiber 340 against the lower member 311. Here, the exit-side end face of the input optical fiber 340 is exposed while being aligned with the exit-side end face of the fiber support 31. The surface of the input optical fiber 340 is coated with a plastic coating except for the tip portion, and in the figure numeral 34 denotes a fiber cable including the input optical fiber 340.

On the other hand, the fiber support 33 also comprises a silicon lower member 331 for supporting 8-core output optical fibers 360 in eight corresponding V-shaped grooves formed in its surface, and an upper member 330 of transparent glass adhered, together with the lower member 331, to the output optical fibers 360 with the second adhesive 38 and bonded onto the surface of the lower member 331 with the second adhesive 38. The back face of this upper member 330 urges the output optical fibers 360 against the lower member 331. Here, the entrance-side end faces of the output optical fibers 360 are exposed while being aligned with the entrance-side end face of the fiber support 33. The surfaces of the respective output optical fibers 360 are covered integrally with a plastic coating except for their tip portions, and in the figure numeral 36 denotes a tape-type fiber cable (ribbon fiber) including these output optical fibers 360.

The waveguide substrate 32 is a glass member, in the surface of which 8-branched optical waveguide 320 of 1-input and 8-output type is formed by the normal flame hydrolysis deposition process. The waveguide substrate 32 may be a member made of silicon. Here, the entrance-side end face and exit-side end faces of the optical waveguide 320 are exposed while being aligned with the entrance-side end face and exit-side end face, respectively, of the waveguide substrate 32.

The first joint part between the exit-side end face of the fiber support 31 and the entrance-side end face of the waveguide substrate 32 is fixed with the first adhesive 37 while the exit-side end face of the input optical fiber 340 is axially aligned with the entrance-side end face of the optical waveguide 320. On the other hand, the second joint part between the exit-side end face of the waveguide substrate 32 and the entrance-side end face of the fiber support 33 is fixed with the first adhesive 37 while the exit-side end faces of the optical waveguide 320 are axially aligned with the entrance-side end faces of the output optical fibers 360 (see FIG. 2).

Here, the first and second adhesives 37, 38 are ultraviolet (UV) curable adhesives. The first adhesive 37 is a material which has a refractive index matching with at least those of the core area of the input optical fiber 340, the optical waveguide 320, and the core area of the output optical fibers 360 and which is transparent to the signal light propagating therein. The second adhesive may be either one selected from thermosetting adhesives and composite adhesives containing an ultraviolet curable catalyst and a thermosetting catalyst, as well as the ultraviolet curable adhesives.

In particular, preferable materials for the upper member 310 and 330 can be selected form, for example, silicon, silica glass (transparent glass as described above, it is useful because UV light can be transmitted therethrough), ceramic, or the like. Preferable materials for the lower member 311 and 331 can be selected from, for example, silicon (V-shaped grooves can be easily formed therein), silica glass (transparent glass as described above, it is useful because UV light can be transmitted therethrough), ceramic (zirconia, crystal quartz), or the like. Further, preferable materials for the waveguide substrate 32 can be selected from, for example, silicon, silica glass, or the like. When both the upper member 310 and the lower member 311 are made of epoxy resin containing filler of 80% or more, the fiber support 31 can be integrally-molded. Also, when both the upper member 330 and 331 are made of epoxy resin containing filler of 80% or more, the fiber support 33 can be integrally-molded similarly.

First Embodiment

The first embodiment of the optical waveguide module according to the present invention will be described next with reference to FIG. 3 to FIG. 7.

Figure 3:
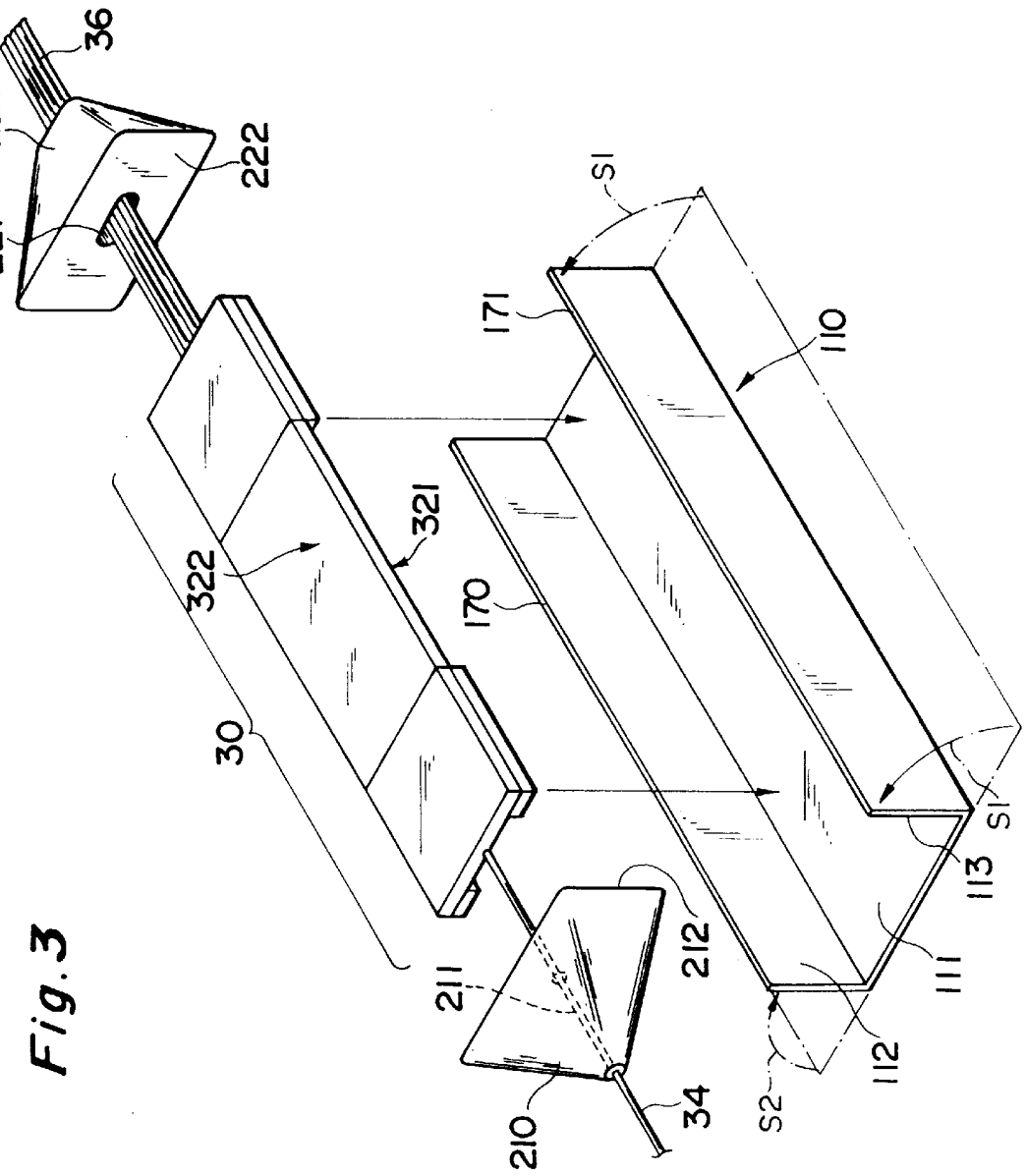
FIG. 3 is a drawing to show a first assembly step for fabricating the first embodiment of the optical waveguide module according to the present invention.

As shown in FIG. 3, the optical waveguide module of the first embodiment comprises a first reinforcing member 110 (a metal plate member) constituting at least a part of the case for housing the optical waveguide device 30. This first reinforcing member 110 is a metal plate having a reference surface 111 and shaped so as to be open at least in the longitudinal direction of the optical waveguide device 30, which has edge portions 170, 171 as bent in the directions indicated by arrows S2, S1, respectively, in the drawing, so as to face each other. The optical waveguide device 30 is set in a space defined by the reference surface 111, a surface 112 of the edge portion 170 continuous from the reference surface 111, and a surface 113 of the edge portion 171 continuous from the reference surface 111 with an upper surface 321 thereof (which is the surface where the optical waveguide 320 is provided) being faced to the reference surface 111 of the first reinforcing member 110. The first reinforcing member 110 and the optical waveguide device 30 may be arranged such that a lower surface 322 opposed to the upper surface 321 and the reference surface 111 face each other.

Further, a first edge component 210 (rubber boot) having a through hole 211 through which the fiber cable including the input optical fiber 340 passes and having an adhesion surface 212 is provided in one open area of the first reinforcing member 110 in the longitudinal direction of the optical waveguide device 30. On the other hand, a second edge component 220 (rubber boot) having a through hole 221 through which the fiber cable including the output optical fibers 360 passes and an adhesion surface 222 is provided in the other open area of the first reinforcing member 110 in the longitudinal direction of the optical waveguide device 30. The optical waveguide device 30 is set in the space defined by these surfaces 111, 112, 113, 211, 222.

Figure 4:
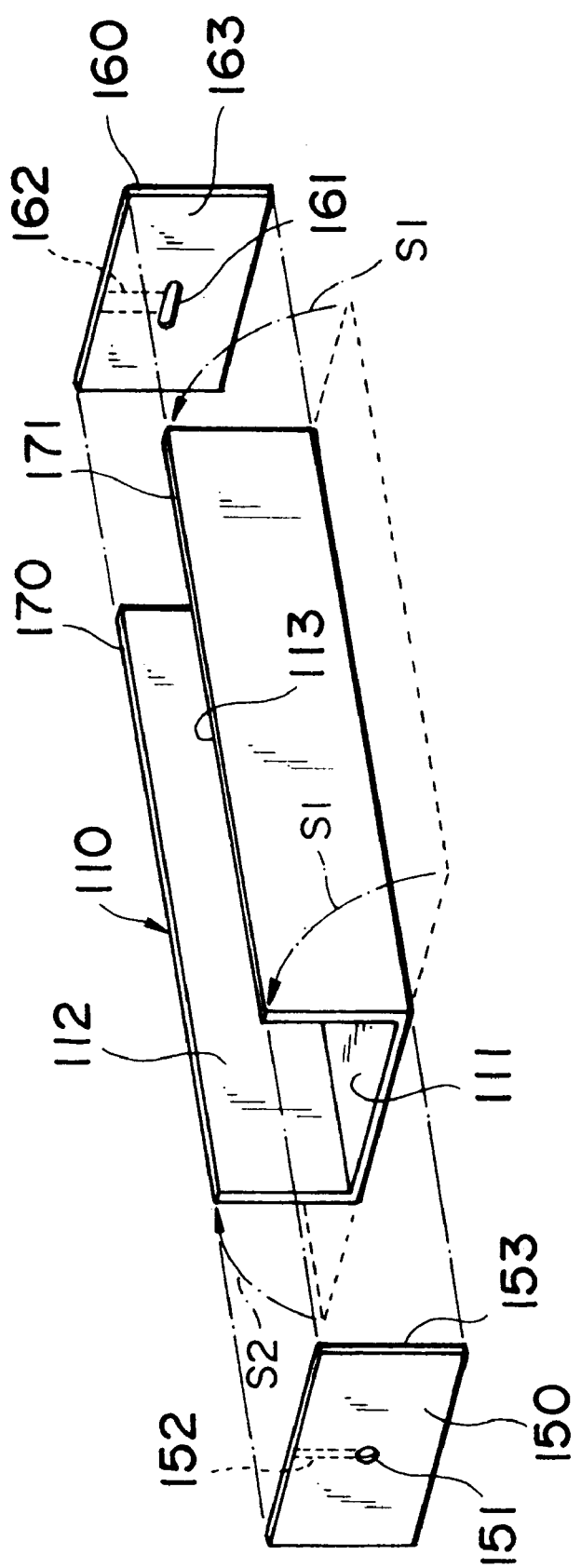
FIG. 4 is a drawing for explaining a modification (using alternative members) of the first assembly step shown in FIG. 3.

Although the above first and second edge components 210, 220 are components made of rubber, they may be metal plate members 150, 160 having a through hole 151, 161, respectively, as shown in FIG. 4. Further, if these plate members 150, 160 are provided with cut portions 152, 162, the fabrication steps can be simplified more. In the case of this structure, the optical waveguide device 30 is also set in the space defined by these surfaces 111, 112, 113, 153, 163.

Figure 5:
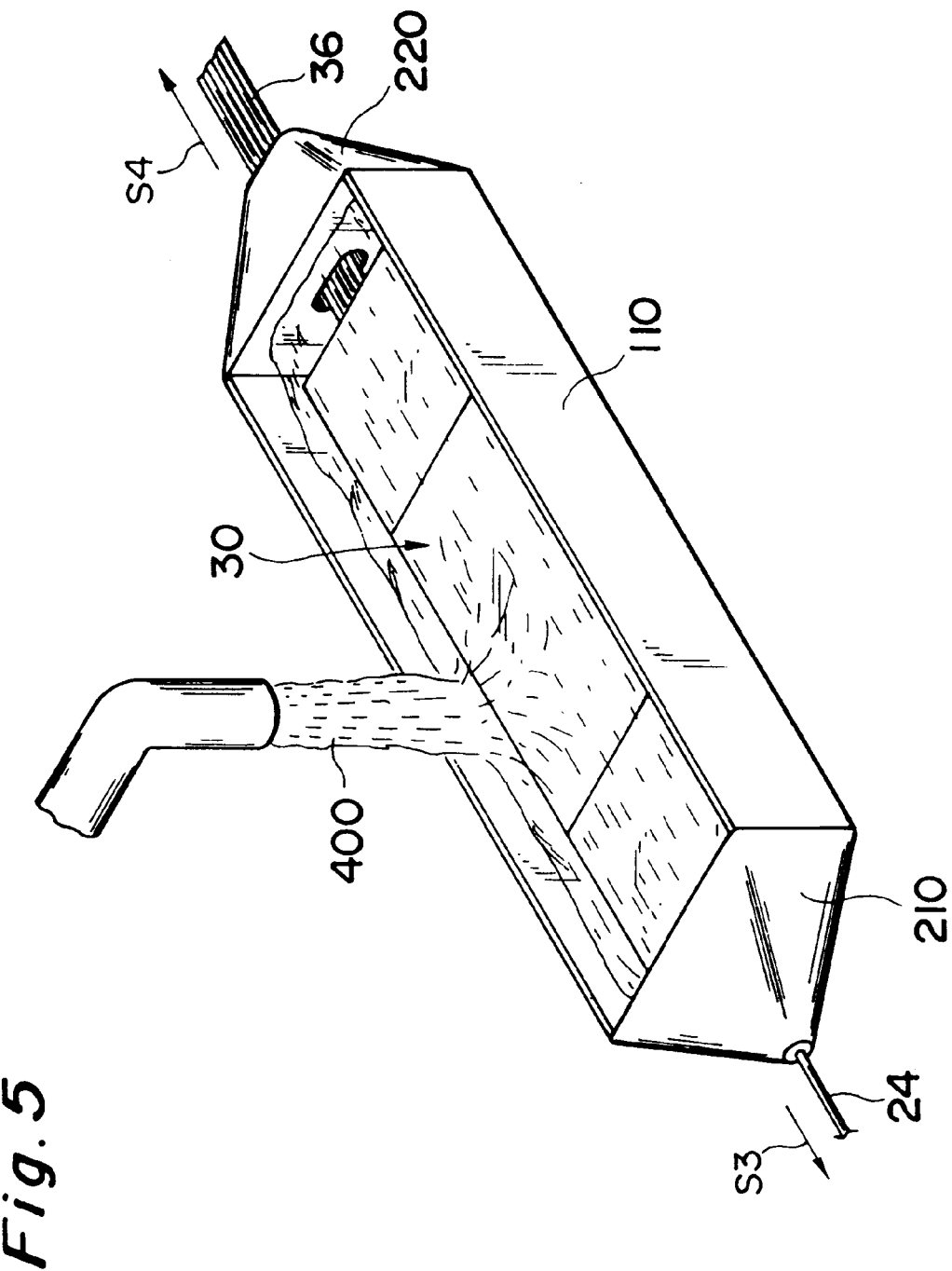
FIG. 5 is a drawing to show a second assembly step for fabricating the first embodiment of the optical waveguide module according to the present invention.

Subsequently, as shown in FIG. 5, the buffer protector 400 is poured into the space as the optical waveguide device 30 is set in the space defined by the surfaces 111, 112, 113, 212, 222. While this buffer protector 400 is poured, predetermined tension is exerted on each fiber cable 34, 36 in the direction indicated by an arrow S3 or S4, respectively, in the drawing. Namely, by pulling the cables 34, 36 in the directions indicated by S3, S4, the optical waveguide device 30 is installed at a predetermined position in the space filled with the buffer protector 400.

Figure 6:
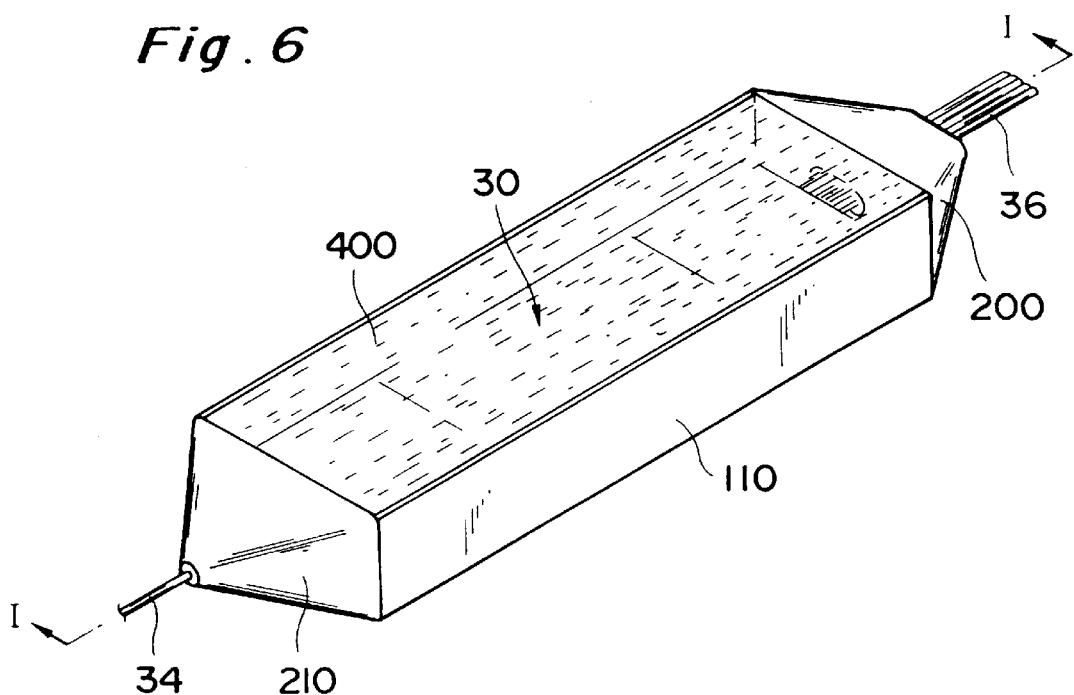
FIG. 6 is a perspective view of the first embodiment of the optical waveguide module according to the present invention, obtained through the assembly steps shown in FIGS. 3 and 5.

The optical waveguide module (the first embodiment) according to the present invention is attained through the above steps. FIG. 6 is a perspective view of the first embodiment of the optical waveguide module according to the present invention and FIG. 7 is a drawing to show the cross-sectional structure of the first embodiment of the optical waveguide module according to the present invention, taken along line I—I in FIG. 6.

Figure 7:
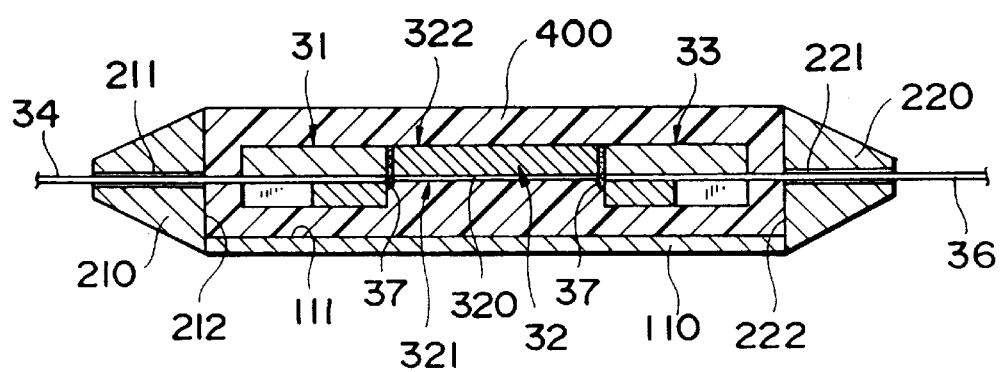
FIG. 7 is a drawing to show the cross-sectional structure of the first embodiment of the optical waveguide module according to the present invention, taken along line I—I in FIG. 6.

As shown in FIGS. 6 and 7, in the optical waveguide module of the first embodiment the buffer protector 400 is exposed from the upper opening of the first reinforcing member 110 constituting the case.

The buffer protector 400 is of urethane rubber and has the modulus of elasticity in the range of about 1 kgf/cm$^2$ to about 20 kgf/cm$^2$ after curing. In particular, actually employed was MU-102 available from Nippon Pelnox Corporation. This buffer protector 400 covers the whole of the optical waveguide device 30 set inside of the first reinforcing member 110. In addition, the buffer protector 400 adheres at least to the reference surface 111 of the first reinforcing member 110 in predetermined strength and has such adhesive strength that the product of the adhesive strength and the adhesion area on the reference surface 111 of the first reinforcing member 110 in contact with the buffer protector 400 is 0.5 or more kgf (Bellcore standard). Further, the first reinforcing member 110 is of stainless steel which is a metal member having high strength, for example, SUS 304.

Here, the buffer protector 400 is relatively soft because it has the low modulus of elasticity in the range of about 1 kgf/cm$^2$ to about 20 kgf/cm$^2$ after curing. Because of it, even if the first reinforcing member 110 is subject to thermal expansion or thermal contraction with change of ambient temperature, the thermal stress acting on the optical waveguide device 30 is suppressed by intervention of the buffer protector 400.

The buffer protector 400 can intrude uniformly into the space between the first reinforcing member 110 and the optical waveguide device 30 by capillarity, immediately flowing it into the case. Therefore, there remains no gap between the first reinforcing member 110 and the optical waveguide device 30, so that no thermal stress occurs from the inside of the buffer protector 400.

Further, since the buffer protector 400 has the relatively low modulus of elasticity and the first reinforcing member 110 (the case) has the relatively high strength, the mechanical impact acting along predetermined directions from the outside to the optical waveguide device 30 is buffered through the buffer protector 400 and first reinforcing member 110.

As explained above, even with occurrence of change of ambient temperature or even with action of external impact, the optical waveguide device 30 is fixedly positioned stably in the case, and the temporal change of adhesive strength of the first adhesive 38 for adhesion at the joint part between the fiber support 31 and the waveguide substrate 32 and at the joint part between the waveguide substrate 32 and the fiber support 33 decreases. In addition, the well-aligned state can be maintained at the first joint part between the input optical fiber 340 and the optical waveguide 320 and at the second joint part between the optical waveguide 320 and the output optical fibers 360. Further, the transmission losses of signal light transmitted from the input optical fiber 340 to the output optical fibers 360 are suppressed stably with a lapse of time.

Figure 8:
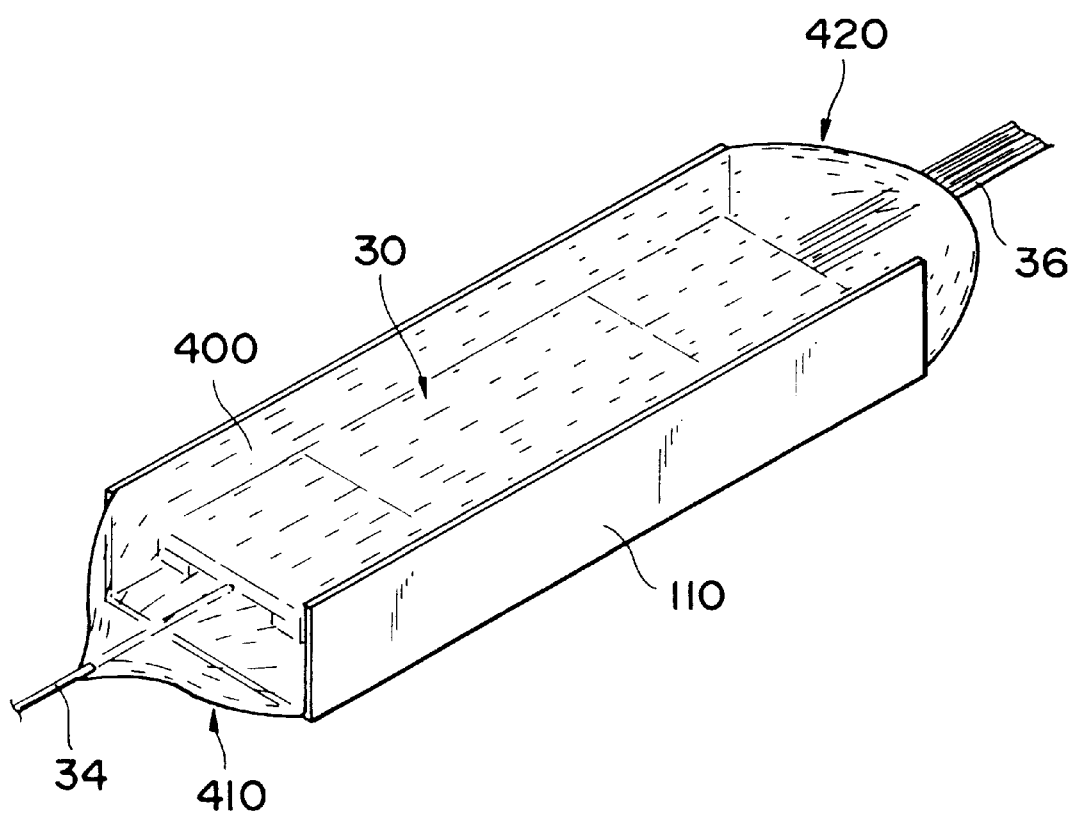
FIG. 8 is a perspective view to show an application of the first embodiment of the optical waveguide module shown in FIG. 6.

Further, as shown in FIG. 8, portions (edge portions 410 and 420 of the buffer protector 400) may lie off the first reinforcing member 110. FIG. 8 is a perspective view to show an application of the first embodiment (FIG. 6) of the optical waveguide module according to the present invention.

In this application, the edge components 210 and 220 in FIG. 6 are unnecessary. Additionally, the edge portions 410 and 420 of the buffer protector 400 function to prevent the break of the fiber cables 34 and 36.

Second Embodiment

Figure 9:
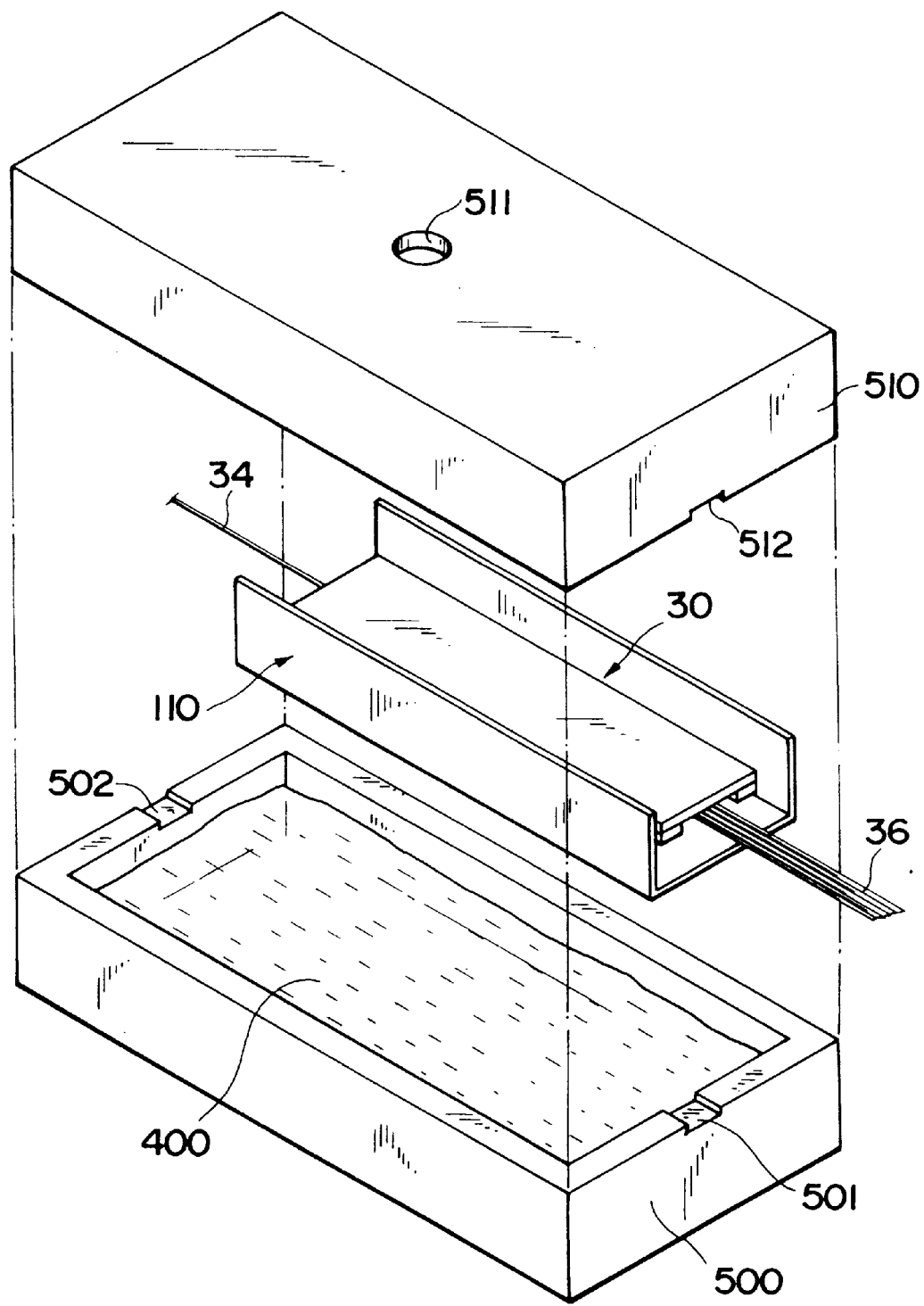
FIG. 9 is a drawing to show the first step for fabricating the second embodiment of the optical waveguide module according to the present invention.
Figure 10:
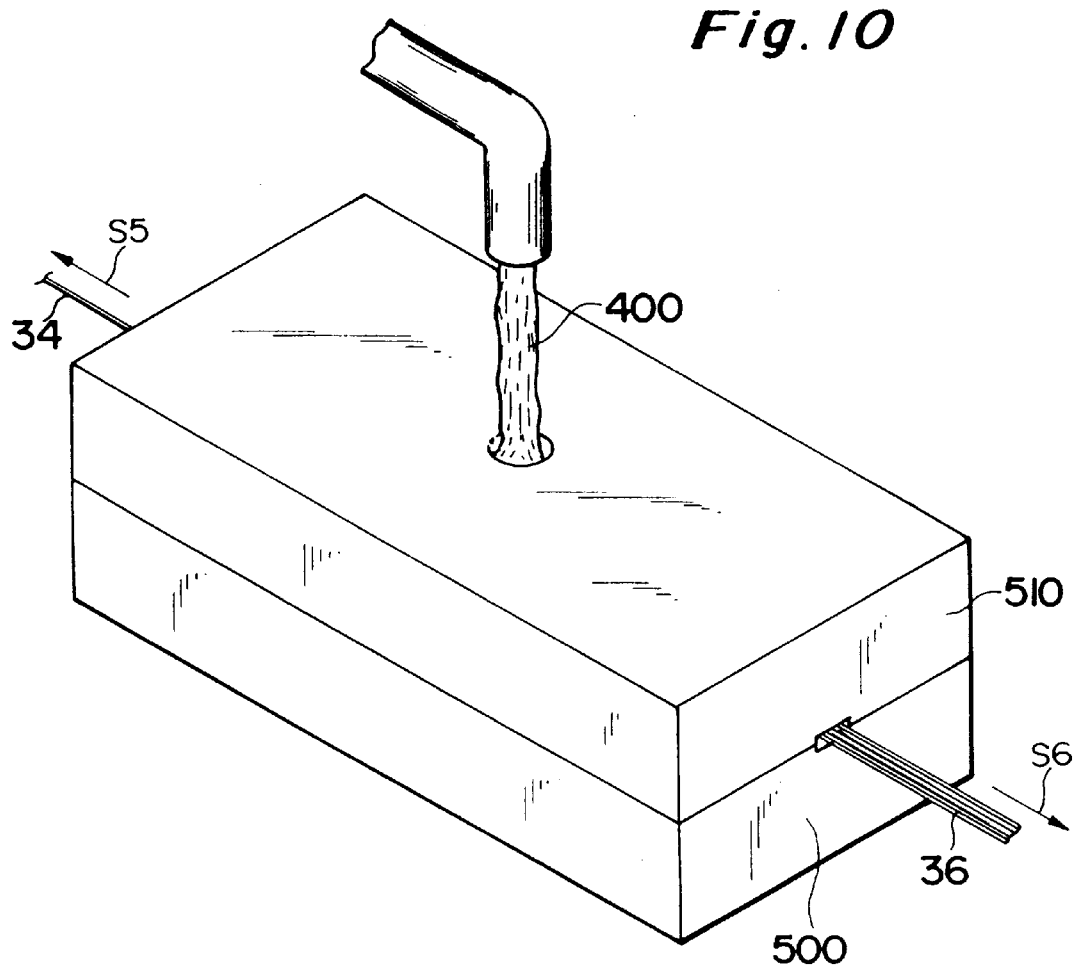
FIG. 10 is a drawing to show the second step for fabricating the second embodiment of the optical waveguide module according to the present invention.

Further, an optical waveguide module according to the present invention may be constructed in such structure as to cover the whole of the first reinforcing member 110 (the case) housing the optical waveguide device 30 with the buffer protector 400. FIG. 9 and FIG. 10 show fabrication steps of the optical waveguide module of the second embodiment.

First, as shown in FIG. 9, prepared are lower mold 500 and upper mold 510 each provided with a predetermined recess. Then the lower mold 500 and upper mold 510 are coupled with each other so that the optical waveguide device 30 and the first reinforcing member 110 are set in a cavity defined by the recesses of these molds 500, 510 with the optical waveguide device 30 being set in the first reinforcing member 110. At this time, a release agent is applied to the surface of each recess of the lower mold 500 and upper mold 510 and part of the buffer protector 400 is preliminarily poured into the recess of the lower mold 500.

Subsequently, as shown in FIG. 10, the buffer protector 400 is poured through a resin inlet port 511 provided in the upper mold 510 into the cavity defined by the recesses of the lower mold 500 and upper mold 510. At this time, predetermined tension is exerted on each optical fiber 340, 360 in the direction indicated by an arrow S5 or S6 in the drawing. Namely, the buffer protector 400 is poured while the cables 34, 36 are pulled in the directions of the arrows S5, S6, respectively, whereby the optical waveguide device 30 is set at the predetermined position in the first reinforcing member 110.

Figure 11:
FIG. 11 is a perspective view of the second embodiment of the optical waveguide module according to the present invention, obtained through the assembly steps shown in FIGS. 9 and 10.
Figure 12:
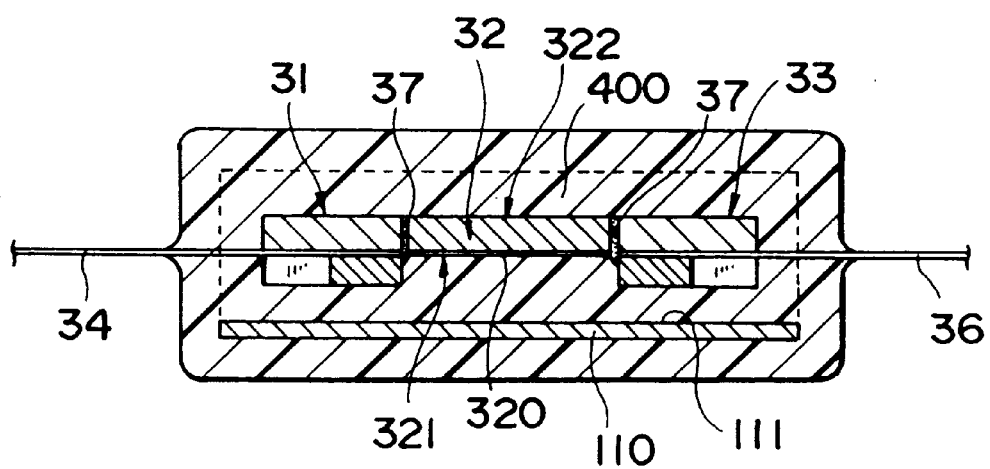
FIG. 12 is a drawing to show the cross-sectional structure of the second embodiment of the optical waveguide module according to the present invention, taken along line II—II in FIG. 11.

The optical waveguide module (the second embodiment) according to the present invention is obtained through the above steps. FIG. 11 is a perspective view of the second embodiment of the optical waveguide module according to the present invention and FIG. 12 is a drawing to show the cross-sectional structure of the second embodiment of the optical waveguide module according to the present invention, taken along line II—II in FIG. 11.

In the optical waveguide module fabricated as described above, the buffer protector 400 also functions in the same manner as the buffer protector 400 of the above first embodiment, and as a result, the optical waveguide module of the present embodiment can also enjoy substantially the same operational effects as the optical waveguide module of the first embodiment described above.

Figure 13:
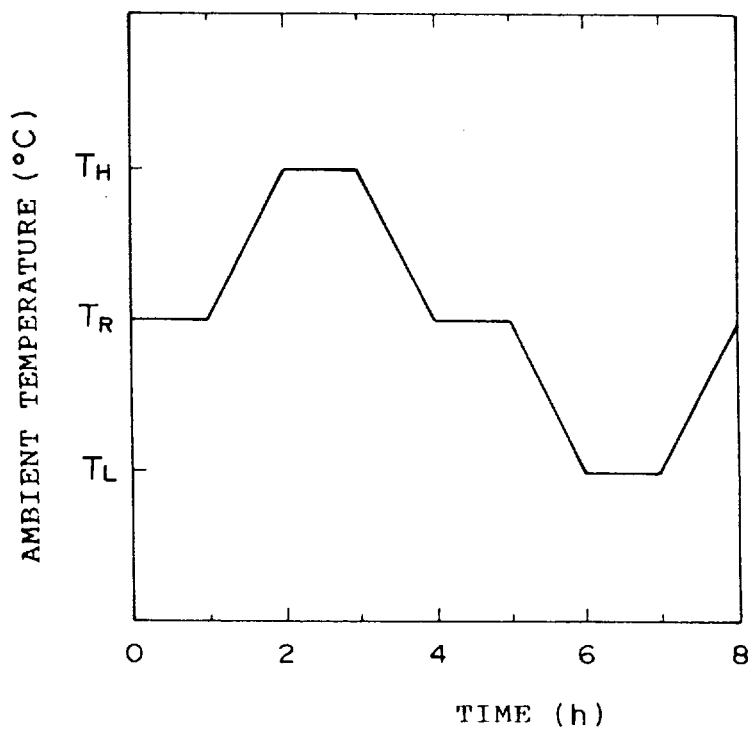
FIG. 13 is a graph to show the relationship between ambient temperature applied to the optical waveguide module and time change, obtained as results of experiments for checking optical loss variation due to thermal loads, for the second embodiment of the optical waveguide module according to the present invention shown in FIGS. 11 and 12.
Figure 14:
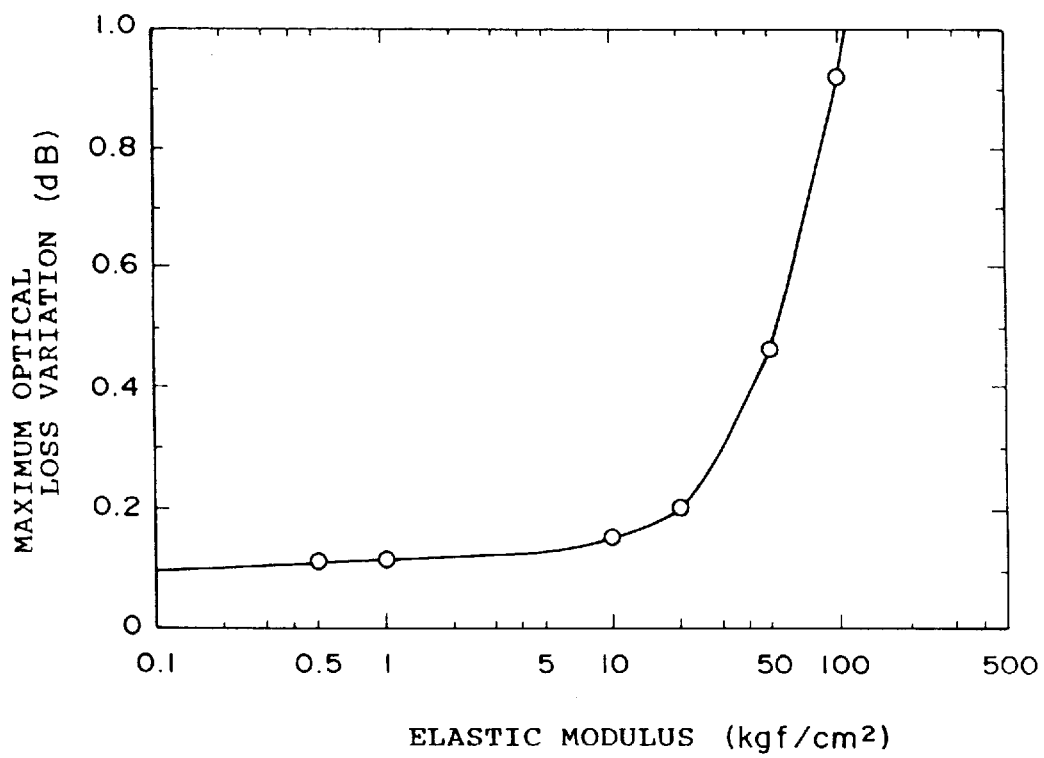
FIG. 14 is a graph to show the relationship between modulus of elasticity of the buffer protector and optical loss variation, obtained as results of experiments for checking the optical loss variation due to thermal loads, for the second embodiment of the optical waveguide module according to the present invention shown in FIGS. 11 and 12.
Figure 15:
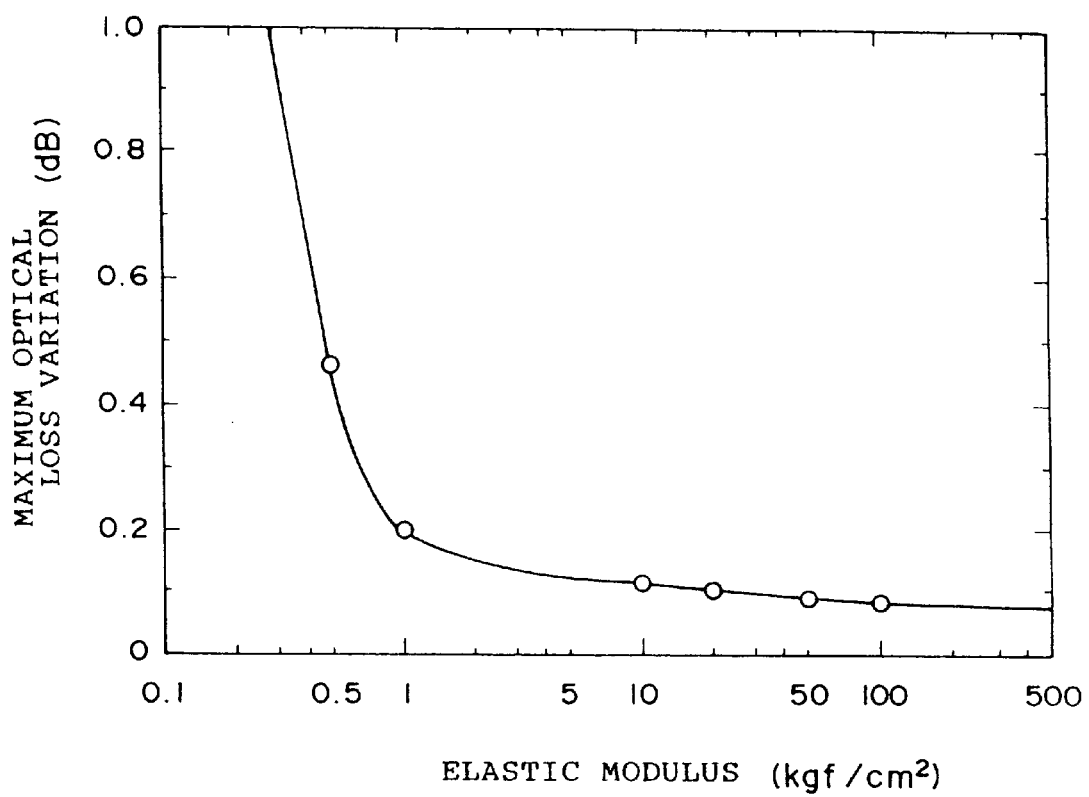
FIG. 15 is a graph to show the relationship between modulus of elasticity of the buffer protector and optical loss variation, obtained as results of experiments for checking the optical loss variation due to external force loads, for the second embodiment of the optical waveguide module according to the present invention shown in FIGS. 11 and 12.

Next described referring to FIG. 13 to FIG. 15 are results of experiments having been conducted for the second embodiment by the present inventors.

First, the inventors conducted an experiment to check the optical loss variation caused by thermal loads for the second embodiment. In this experiment six different samples with moduli of elasticity of the buffer protector 400 included in the range of 0.5 kgf /cm$^2$ to about 100 kgf/cm$^2$ were prepared as optical waveguide modules to be compared.

FIG. 13 shows the time change of ambient temperature loaded on these six types of optical waveguide modules. In FIG. 13, the abscissa represents the passing time (h) while the ordinate the ambient temperature (°C). The highest temperature $T_H$ is +75° C., the lowest temperature $T_L$ is −45° C., and $T_R$ is room temperature.

Such heat cycle tests with each cycle taking 8 hours were repeated throughout two weeks, and before and after the tests, the optical loss variation was measured for the all waveguide devices 30 in each optical waveguide module prepared. Results of the measurement are shown in FIG. 14. The measurement of optical loss is performed by measuring the optical loss between the input optical fiber 340 and each of the output optical fibers 360, respectively. In this FIG. 14, the abscissa represents the modulus of elasticity (kgf/cm$^2$) of the buffer protector 400 and the ordinate the maximum optical loss variation (dB) of the optical waveguide device 30. From FIG. 13, after the modulus of elasticity of the buffer protector 400 exceeds 20 kgf/cm$^2$, the maximum optical loss variation in the optical waveguide device 30 abruptly increases from below 0.2 dB. Therefore, as long as the modulus of elasticity of the buffer protector 400 is 20 or less kgf/cm$^2$, the maximum optical loss variation of optical waveguide device 30 can be suppressed below the level to raise no problem in practical use, i.e., below 0.2 dB.

Further, the inventors carried out an experiment for checking the optical loss variation caused by external loads for the second embodiment. In this experiment, six different samples with moduli of elasticity of the buffer protector 400 included in the range of 0.5 kgf/cm$^2$ to about 100 kgf/cm$^2$ were prepared as optical waveguide modules to be compared.

These six types of optical waveguide modules were fixed at the central portion and the tension of 5N, which was considered to occur in practical use, was applied to the end portion located on the output optical fiber 360 side with respect to the central portion for about one minute. Before and after such external load tests, the maximum optical loss variation was measured for the all cores of the optical waveguide device 30 in each optical waveguide module prepared, and the results of the measurement are shown in FIG. 15. In this FIG. 15, the abscissa represents the modulus of elasticity of the buffer protector 400 and the ordinate the maximum optical loss variation of optical waveguide device 30.

From FIG. 15, in the range where the modulus of elasticity of the buffer protector 400 is smaller than 1 kgf/cm$^2$, the maximum optical loss variation of optical waveguide device 30 abruptly increases from below 0.2 dB. Therefore, as long as the modulus of elasticity of the buffer protector 400 is 1 or more kgf/cm$^2$, the maximum optical loss variation of optical waveguide device 30 can be suppressed below the level to raise no problem in practical use, i.e., below 0.2 dB.

Accordingly, the above experiment results confirm that the optical loss variation of optical waveguide device 30 can be suppressed below the level to raise no problem in practical use as long as the modulus of elasticity of the buffer protector 400 is within the range of 1 kgf/cm$^2$ to about 20 kgf/cm$^2$.

Third Embodiment

Figure 16:
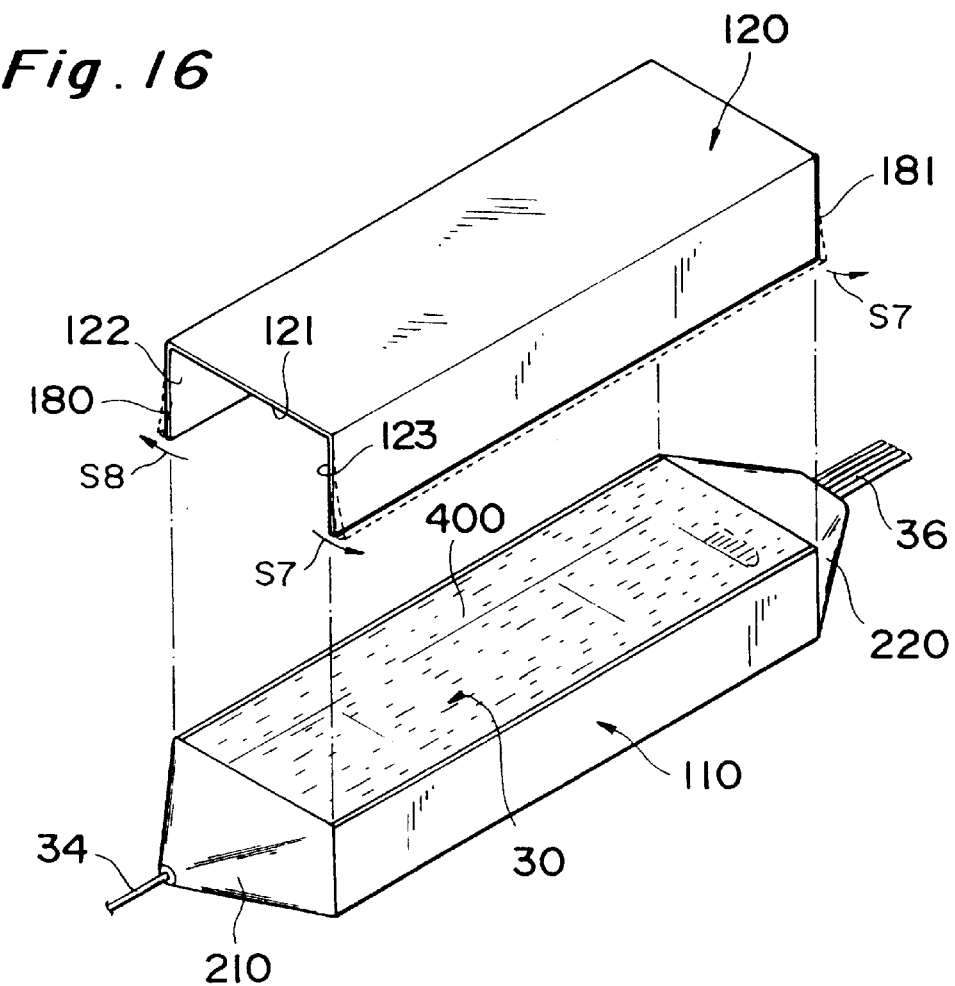
FIG. 16 is a drawing to show a part of assembly step for fabricating the third embodiment of the optical waveguide module according to the present invention.
Figure 17:
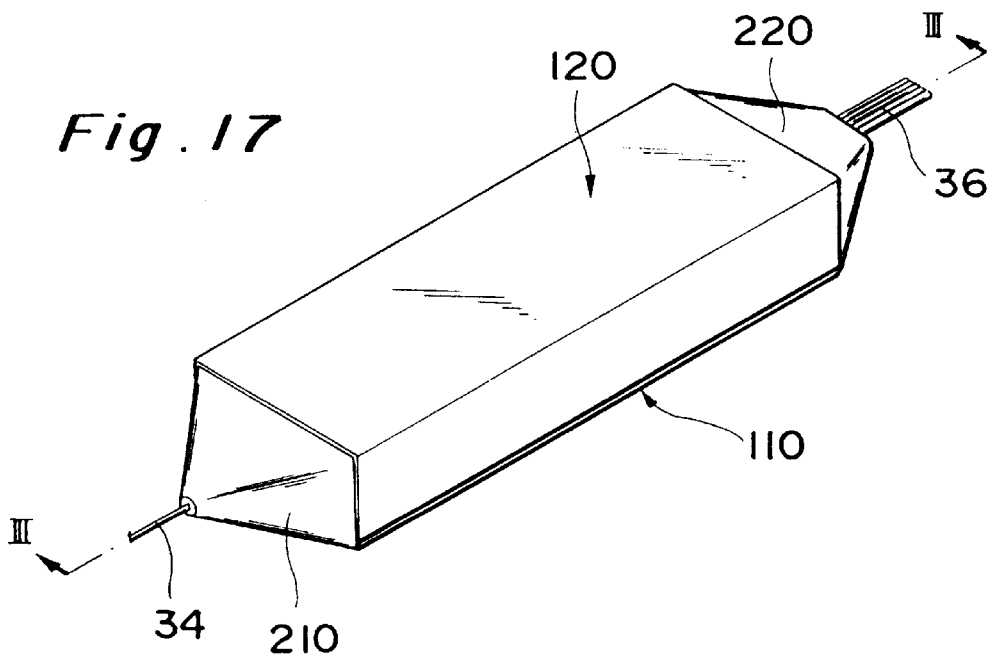
FIG. 17 is a perspective view to show the third embodiment of the optical waveguide module according to the present invention, obtained through the assembly step shown in FIG. 16.

Next, an optical waveguide module according to the present invention may be comprised of the first reinforcing member 110 and a second reinforcing member 120 of the same shape and the same material, as a case for housing the optical waveguide device 30, as shown in FIG. 16 and FIG. 17.

Particularly, this second reinforcing member 120 is also made of metal (stainless steel SUS 304) constituting at least a part of the case for housing the optical waveguide device 30, similarly as the first reinforcing member 110 was. Further, this second reinforcing member 120 is a metal plate having a reference surface 121 and shaped so as to be open at least in the longitudinal direction of the optical waveguide device 30, which has edge portions 180, 181 (third and fourth edge portions) as bent so as to face each other. The optical waveguide device 30 is set in a space defined by the reference surface 121, a surface 122 of the edge portion 180 continuous from the reference surface 121, and a surface 123 of the edge portion 181 continuous from the reference surface 121 so that the back face 322 thereof (on the opposite side to the upper surface 321) is faced to the reference surface 121 of the second reinforcing member 120.

The optical waveguide module of the third embodiment is fabricated by putting the second reinforcing member 120 over the module (of the same structure as the optical waveguide module shown in FIG. 6) obtained through the fabrication steps of the foregoing first embodiment (FIG. 3 to FIG. 5). Namely, the second reinforcing member 120 comes to engage with the first reinforcing member 110 in such a way that, as shown in FIG. 16, the edge portions 180, 181 of the second reinforcing member 120 are expanded in the directions represented by the arrows S7, S8 in the drawing and then the edge portions 180, 181 are set to hold the edge portions 170, 171 of the first reinforcing member 110.

Figure 18:
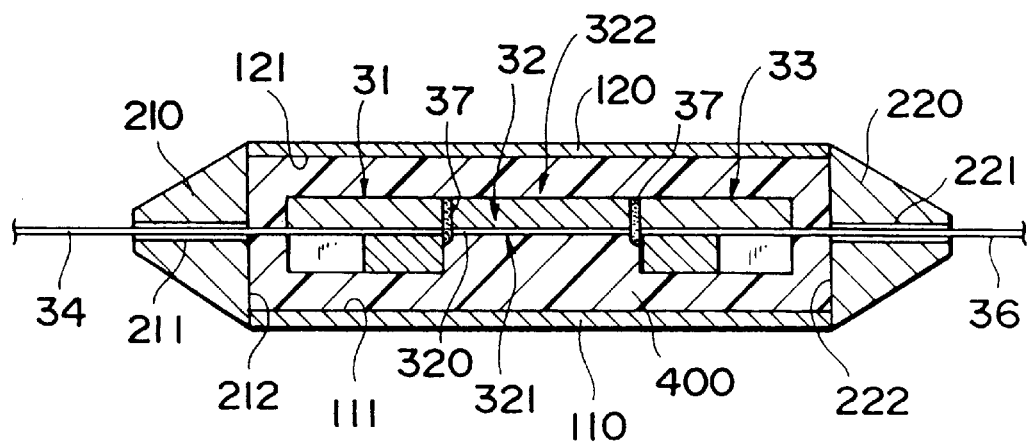
FIG. 18 is a drawing to show the cross-sectional structure of the third embodiment of the optical waveguide module according to the present invention, taken along line III—III in FIG. 17.
Figure 19:
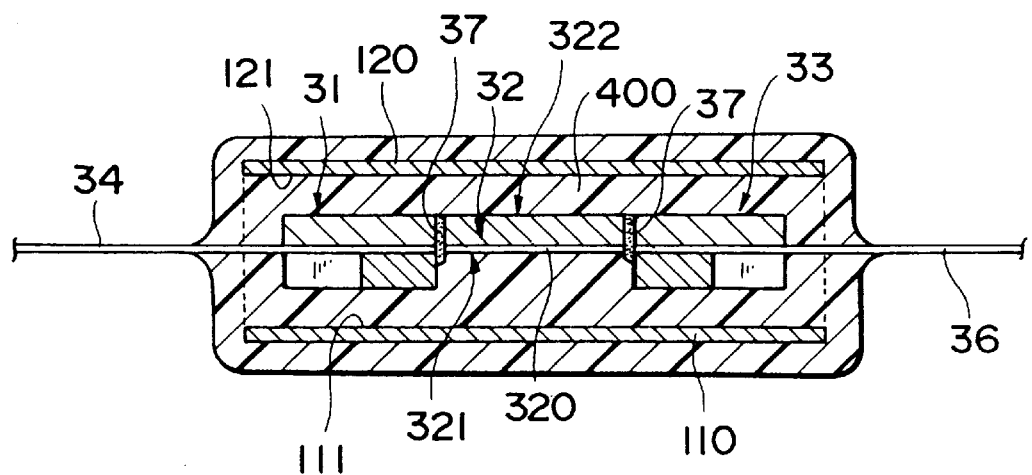
FIG. 19 is a drawing to show the cross-sectional structure of the fourth embodiment of the optical waveguide module according to the present invention.

The optical waveguide module (the third embodiment) shown in FIG. 17 and FIG. 18 is obtained through the above fabrication steps. FIG. 17 is a perspective view to show the third embodiment of the optical waveguide module according to the present invention and FIG. 18 is a drawing to show the cross-sectional structure of the third embodiment of the optical waveguide module according to the present invention, taken along line III—III in FIG. 17.

The structure as shown in FIG. 4 can also be applied to this third embodiment. Further, the buffer protector 400 in this third embodiment also functions in the same way as the buffer protector 400 of the foregoing first embodiment, and as a result, the present embodiment can enjoy substantially the same operational effects as the optical waveguide module of the foregoing first embodiment.

Fourth Embodiment

Further, an optical waveguide module according to the present invention may be constructed so that the whole of the first and second reinforcing members 110, 120 constituting the case for housing the optical waveguide device 30 is encapsulated in the buffer protector 400.

The optical waveguide module of the fourth embodiment is also fabricated through the steps shown in FIGS. 9 and 10 in the same manner as the optical waveguide module of the second embodiment.

FIG. 18 shows the cross-sectional structure of the fourth embodiment of the optical waveguide module according to the present invention. This cross-sectional view of the fourth embodiment corresponds to the cross section taken along line II—II in FIG. 11, for example. Further, in this fourth embodiment, the buffer protector 400 also functions in the same manner as the buffer protector 400 of the foregoing first embodiment and as a result, the present embodiment can also enjoy substantially the same operational effects as the optical waveguide module of the foregoing first embodiment.

It is noted here that the present invention is by no means limited to the embodiments as described above but may have a variety of modifications. For example, the buffer protector 400 for covering and protecting the case (the first reinforcing member 110, or the both first and second reinforcing members 110, 120) and the optical waveguide device 30 was made of urethane resin. However, instead of this urethane resin, silicon resin or epoxy resin may be used for the buffer protector 400. Such modifications also enjoy substantially the same operational effects as the first to fourth embodiments.

In the first to fourth embodiments as described above, the case for housing the optical waveguide device 30 was made of stainless steel. However, instead of this stainless steel, either titanium metal, aluminum metal, or spring steel may be used as a material for the case, achieving substantially the same operational effects as in each embodiment described above.

In each embodiment described above, the fiber support 31, waveguide substrate 32, and fiber support 33 were adhered to each other with the ultraviolet curable adhesive as the first adhesive. However, instead of the ultraviolet curable adhesive, the thermosetting adhesive, or the composite adhesive containing the ultraviolet curable catalyst and thermosetting catalyst may be used as the first adhesive, achieving substantially the same operational effects as in each embodiment.

In each embodiment described above, the optical waveguide 320 was a branch device of 1-input and 8-output type. However, substantially the same operational effects as in each embodiment described above can also be achieved when the present invention is applied to optical waveguides of any type, either one input and multiple output type, multiple input and one output type, or multiple input and multiple output type.

Further, in each embodiment described above, the input optical fiber 340 was a single-core optical fiber and the output optical fibers 360 were 8-core optical fibers. However, these optical fibers may be input and output optical fibers in the structure including any number of optical fibers, corresponding to the light input and output type of the optical waveguide. Also in this case, substantially the same operational effects can be achieved as in each embodiment described above.

Figure 20:
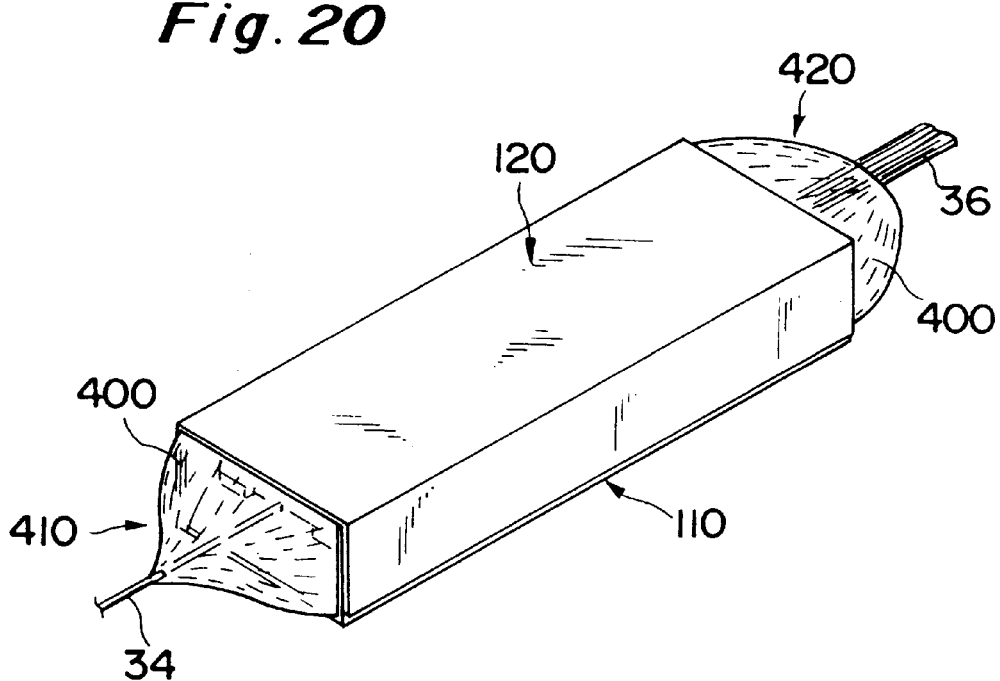
FIG. 20 is a perspective view to show an application of the third embodiment of the optical waveguide module shown in FIG. 17.

Additionally, the optical waveguide module shown in FIG. 20 can be obtain by putting the second reinforcing member 120 (see FIG. 16) over the optical waveguide module of FIG. 6. FIG. 20 is a perspective view to show an application of the third embodiment (FIG. 17) of the optical waveguide module according to the present invention. Also, in the application of the third embodiment, since the buffer protector 400 has the edge portions 410 and 420 that lie off the first and second reinforcing members 110 and 120, the edge component 210 and 220 in FIG. 17 are unnecessary.

Figure 21:
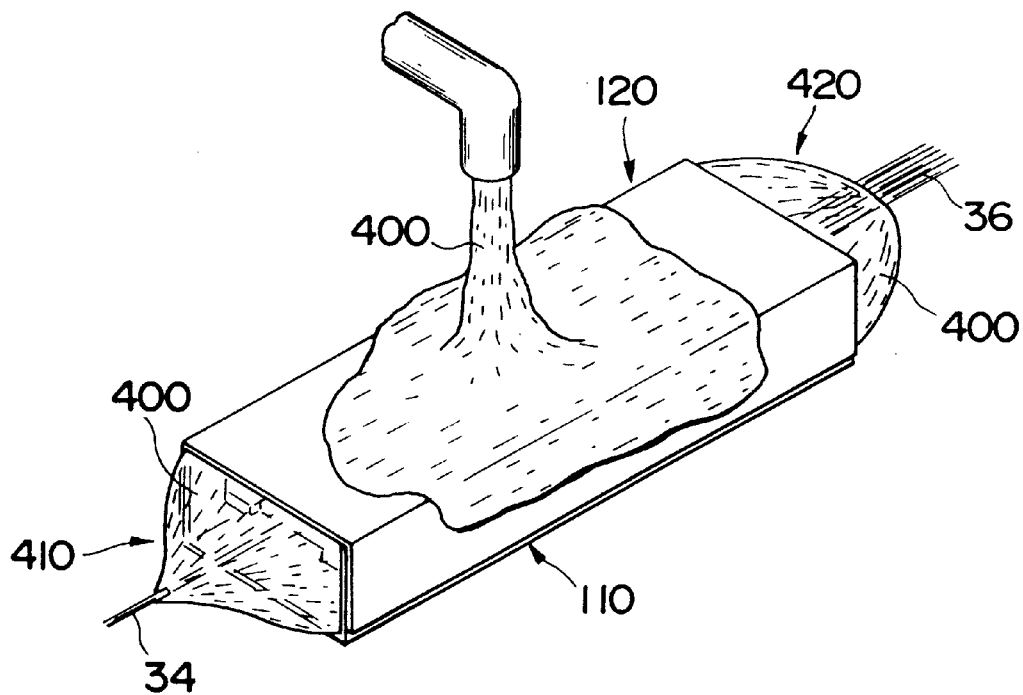
FIG. 21 is a drawing to explain a method differ to the fabricating method shown in FIGS. 9 and 10, for fabricating the fourth embodiment of the optical waveguide module shown in FIG. 19.

Furthermore, as shown in FIG. 21, an optical waveguide module having the same structure as the fourth embodiment of the optical waveguide module (FIG. 19) according to the present invention can be obtained by encapsulating the optical waveguide module shown if FIG. 20 with the buffer protector 400. The fabricating method of FIG. 21 is applicable to the first embodiment shown in FIG. 6, and thereby an optical waveguide module having the same structure as the second embodiment (FIGS. 11 and 12) of the optical module according to the present invention by this fabricating method (FIG. 21).

Industrial Applicability

As detailed above, the optical waveguide modules according to the present invention are arranged so that the buffer protector covers the whole of the optical waveguide device as filling the inside of the case and it closes the open areas of the case at least in the longitudinal direction of the optical waveguide device (or the optical fibers).

By this, the optical waveguide modules according to the present invention can make the buffer protector protect the optical waveguide device against stress caused by ambient temperature and against impact acting from the outside. In addition, since the well-aligned state is maintained at the first joint part between the input optical fiber and the optical waveguide and at the second joint part between the optical waveguide and the output optical fibers, the optical waveguide modules of the present invention have high reliability as being excellent in environment resistance properties.

Further, the optical waveguide modules according to the present invention have such effects as to reduce the number of package components and as to reduce costs including material costs and assembly processing costs, when compared with the conventional optical waveguide modules.

We claim:

1. An optical waveguide module comprising:
   an optical waveguide device having a waveguide substrate in an upper surface of which an optical waveguide is provided, and a support member attached to the tip of an optical fiber and fixed to the waveguide substrate in such a state that one end of the optical waveguide is optically connected to one end of the optical fiber;
   a first reinforcing member having a first reference surface facing said waveguide substrate and shaped so as to be open at least in the longitudinal direction of said optical waveguide device; and
   a buffer protector covering at least a joint part between said waveguide substrate and said support member and a part of said optical fiber and adhering in predetermined strength to the first reference surface of said first reinforcing member.

2. An optical waveguide module according to claim 1, wherein said buffer protector has such adhesive strength that a product of the adhesive strength and an adhesion area on the first reference surface of said first reinforcing member in contact with said buffer protector is not less than 0.5 kgf.

3. An optical waveguide module according to claim 1, wherein said first reinforcing member has first and second edge portions bent so as to face each other, and wherein at least a part of said optical waveguide device is housed in a space defined by said first reference surface, a first surface of said first edge portion continuous from the first reference surface, and a second surface of said second edge portion continuous from the first reference surface.

4. An optical waveguide module according to claim 3, further comprising an edge component having a through hole for letting said optical fiber pass and having an adhesion surface to be adhered to said buffer protector.

5. An optical waveguide module according to claim 3, wherein said buffer protector is provided in the space defined by said first reference surface of said first reinforcing member, the first surface of said first edge portion continuous from the first reference surface, and the second surface of said second edge portion continuous from the first reference surface in such a state as to cover the whole of said optical waveguide device and said buffer protector encapsulates the whole of the first reinforcing member.

6. An optical waveguide module according to claim 3, further comprising a second reinforcing member having a second reference surface facing said waveguide substrate and shaped so as to be open at least in the longitudinal direction of said optical waveguide device, said second reinforcing member having third and fourth edge portions bent so as to face each other,
   wherein said second reinforcing member is positioned so that the second reference surface thereof is opposed to the first reference surface of said first reinforcing member with said optical waveguide device inbetween.

7. An optical waveguide module according to claim 6, wherein said second reinforcing member engages with said first reinforcing member so that said third and fourth edge portions hold the first and second edge portions of said first reinforcing member.

8. An optical waveguide module according to claim 6, wherein said buffer protector encapsulates the whole of said first reinforcing member and the whole of the second reinforcing member in such a state as to cover the whole of said optical waveguide device.

9. An optical waveguide module according to claim 1, wherein said buffer protector has a portion that lies off said first reinforcing member.

10. An optical waveguide module according to claim 1, wherein said buffer protector has a modulus of elasticity in the range of 1 kgf/cm$^2$ to 20 kgf/cm$^2$ after curing.

11. An optical waveguide module according to claim 1 wherein said first reinforcing member has two longitudinal ends spaced apart in the longitudinal direction of said optical waveguide device and defining respective planes perpendicular to said first reference surface, said first reference surface has a width in a direction perpendicular to the longitudinal direction of said optical waveguide device, and first reinforcing member is open at both of said longitudinal ends across said width.

12. An optical waveguide module according to claim 1 wherein said first reinforcing member is constituted by a plate having a constant cross-section in the longitudinal direction of said optical waveguide device and composed of a central portion which defines said first reference surface and two edge portions adjoining said central portion and bent relative to said central portion in order to face one another.

13. An optical waveguide module comprising:
   an optical waveguide device having a waveguide substrate in an upper surface of which an optical waveguide is provided, and a support member attached to the tip of an optical fiber and fixed to an end face of the waveguide substrate in such a state that one end of the optical waveguide is optically connected to one end of the optical fiber;
   a first reinforcing member having a first reference surface facing said waveguide substrate and shaped so as to be open at least in the longitudinal direction of said optical waveguide device, said first reinforcing member having first and second edge portions bent so as to face each other; and
   a buffer protector at least a part of which is provided in a space defined by said first reference surface, a first surface of said first edge portion continuous from the first reference surface, and a second surface of said second edge portion continuous from the first reference surface in such a state as to cover at least a joint part between said waveguide substrate and said support member, and a part of said optical fiber, said buffer protector adhering in predetermined strength to the first reference surface of said first reinforcing member.

14. An optical waveguide module according to claim 13, wherein said buffer protector has such adhesive strength that a product of the adhesive strength and an adhesion area on the first reference surface of said first reinforcing member in contact with said buffer protector is not less than 0.5 kgf.

15. An optical waveguide module according to claim 13, wherein said buffer protector has a portion that lies off said first reinforcing member.

16. An optical waveguide module according to claim 13, further comprising an edge component having a through hole for letting said optical fiber pass and having an adhesion surface to be adhered to said buffer protector.

17. An optical waveguide module according to claim 13, wherein said buffer protector encapsulates the whole of the first reinforcing member.

18. An optical waveguide module according to claim 13, further comprising a second reinforcing member having a second reference surface facing said waveguide substrate and shaped so as to be open at least in the longitudinal direction of said optical waveguide device, said second reinforcing member having third and fourth edge portions bent so as to face each other, wherein said second reinforcing member is positioned so that the second reference surface thereof is opposed to the first reference surface of said first reinforcing member with said optical waveguide device inbetween.

19. An optical waveguide module according to claim 18, wherein said second reinforcing member engages with said first reinforcing member so that said third and fourth edge portions hold the first and second edge portions of said first reinforcing member.

20. An optical waveguide module according to claim 18, wherein said buffer protector encapsulates the whole of said first reinforcing member and the whole of the second reinforcing member in such a state as to cover the whole of said optical waveguide device.

21. An optical waveguide module according to claim 13, wherein said buffer protector has a modulus of elasticity in the range of 1 $kgf/cm^2$ to 20 $kgf/cm^2$ after curing.

22. An optical waveguide module according to claim 13 wherein said first reinforcing member has two longitudinal ends spaced apart in the longitudinal direction of said optical waveguide device, each of said longitudinal ends defines a plane which is orthogonal to said first reference surface and said first and second edge portions of said first reinforcing member, and said first reinforcing member is open at each of said ends entirely across said planes between said first and second edge portions.

23. An optical waveguide module according to claim 13 wherein said first reinforcing member is a plate having a constant cross-section in the longitudinal direction of said optical waveguide device.

* * * * *